June 24, 1958

M. E. RUSSELL 2,840,669

CONTROL DEVICE

Filed Dec. 6, 1956

INVENTOR.
MARVIN E. RUSSELL
BY *Robert S. Craig*
ATTORNEY

United States Patent Office 2,840,669
Patented June 24, 1958

2,840,669

CONTROL DEVICE

Marvin E. Russell, St. Louis Park, Minn., assignor to Minneapolis-Honeywell Regulator Company, Minneapolis, Minn., a corporation of Delaware Application December 6, 1956, Serial No. 626,627

4 Claims. (Cl. 200—140)

This invention relates to thermostatic switches and more particularly to thermally responsive switches having fail safe features for use in theromstatically controlling furnaces, ovens and other appliances.

Fluid thermostats which have no fail safe feature are likely to be dangerous if fluid should leak. In such a case, the expansion of the fluid will not be great enough to actuate the cutout switch at the desired point, and if enough fluid leaks, the expansion of the fluid will not be sufficient to actuate the cutout switch at all. The heating could therefore continue to undesirable or dangerous temperatures.

In the present invention a chamber is completely filled with a liquid having a boiling point below the high temperature limit desired. By this arrangement, the diaphragm is normally supported by the liquid so that any loss of liquid causes deflection of the diaphragm, actuating the switch open circuit position. This cannot be done with an incomplete fill of liquid or a fill of gas. According to my invention, as the high temperature limit is reached, the liquid boils and its vapor pressure then significantly moves the diaphragm actuating the switch. Because it is the vapor pressure, not expansion of the liquid itself, which moves the diaphragm, loss of liquid will not appreciably affect the upper limit. This is not true with a complete fill of a liquid which actuates a switch by liquid expansion alone. It is seen therefore that my invention overcomes the difficulties the art has found in providing a fail safe switch whose upper control point is not affected by partial loss of the fill.

It is therefore an object of my invention to provide a fail safe thermostatic switch which will operate a heating device and yet will disconnect the heating source whenever leakage occurs, even though the leak is very slow, without changing the cutout point until failure has occurred.

Another object of my invention is to provide a novel type fill for a thermally responsive unit capable of expansion and contraction under the influence of temperature to regulate a heating device and which will not damage the expansible chamber when the sensing element is soldered or over heated.

Other objects and uses of my invention will become apparent upon inspection of the following description and drawings in which.

Figure 1:
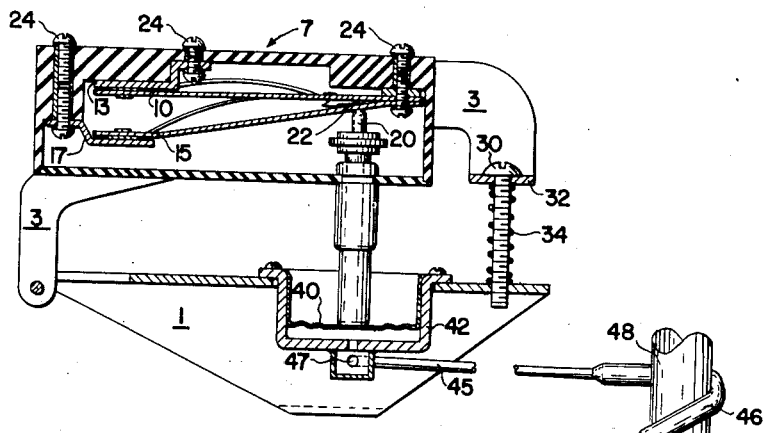
Figure 1 is a sectional view of my invention showing the position of the components in the normal operating range of the device.
Figure 2:
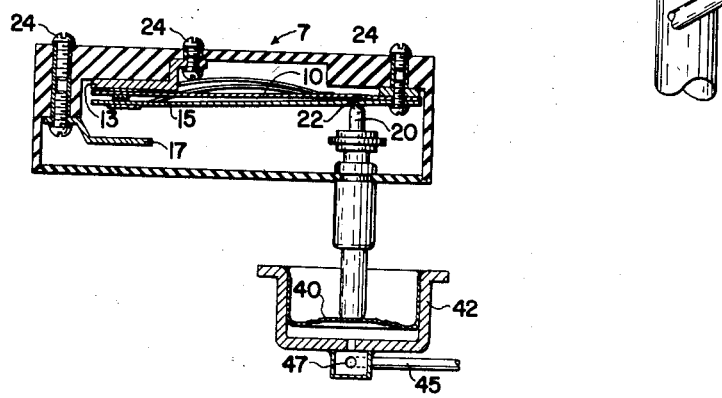
Figure 2 is a sectional view showing the position of the components when high temperature limit is exceeded and Figure 3 is a sectional view showing the position of the components when a leak has occurred.
Figure 3:
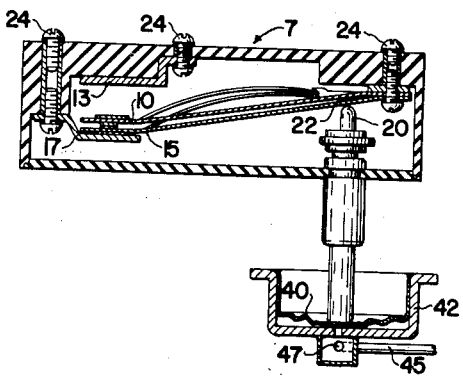

Referring to Figures 1, 2 and 3 which show the device in different operative positions, pivotally mounted to base 1 is a generally U-shaped arm 3 upon which switch 7 is fixed. Switch 7 is of a type shown in Patent 2,495,349 to R. D. Rohr, dated January 24, 1950. Included in snap switch 7 are contact arm 10 adapted to cooperate with contact 13 and contact arm 15 adapted to cooperate with contact 17. Each arm is independently operated by actuating plunger 20. Plunger 20 bears on arm 15 which has a dimple 22 which bears on arm 10. As seen in Figure 2, upward movement of plunger 20 causes arm 15 to disconnect from contact 17, and as seen in Figure 3, downward movement of plunger 20 causes arm 10 to disconnect from contact 13. The circuit (not shown) to be controlled may be connected to contact 13 and contact 17 by means of suitable screws 24, so that when the arms 10 and 15 are in the position shown in Figure 1, the circuit is closed by the conducting path from contact 13 to arm 10 to arm 15 to contact 17. In Figures 2 and 3 the circuit is open. The position of switch 7 relative to the base 1 may be adjusted by a screw 30 rotatably mounted in a lateral extension 32 of arm 3 and threadedly engaging base 1. Base 1 and arm 3 are biased apart by compression spring 34.

Plunger 20 is adapted to be operated by a diaphragm 40 mounted on a container 42. A tube 45 of length suitable to reach the area in which the temperature is to be controlled but of relatively small cross section is connected to a port 47 communicating with the interior of container 42 so that free flow of liquid or vapor may exist between tube 45 and container 42.

Container 42 and tube 45 are completely filled with a volatile fluid, such as CCl$_4$ whose boiling point, as confined by diaphragm 40, is less than the upper limit of temperature control. An extension 46 of tube 45 makes intimate contact, such as by soldering, to a pipe 48 whose temperature is to be controlled.

As the controlled temperature increases, the fluid in tube 45 and container 42 expands, but switch 7 is positioned so that this thermal expansion does not move plunger 20 enough to disconnect arm 15 from contact 17. Further increase in temperature causes the fluid in tube 45 to boil and the vapor pressure as transmitted to diaphragm 40 increases rapidly. Switch 7 is adjusted so that arm 15 disconnects from contact 17 when diaphragm 40 has extended to a position indicative of the upper limit of the controlled temperature.

It should be noted that operation of switch 7 to separate arm 15 from contact 17 is not caused by the thermal expansion of liquid in container 42 but rather by the vapor pressure after the fluid has boiled. The advantage of this is seen when a leak occurs, in which case the liquid volume would drop and it would take a higher temperature than before to expand the liquid to operate the switch. If enough liquid has escaped, the switch could not be operated and the temperature would be allowed to increase beyond a safe limit. By utilizing the vapor pressure after boiling the fluid, this deficiency is avoided because a loss of liquid would not appreciably affect the vapor pressure and the upper limit would be maintained.

If a leak develops while the fluid is in its liquid stage, the diaphragm 40 under the influence of its spring rate will distend until the situation shown in Figure 3 is reached at which time plunger 20 has lowered enough to allow switch arm 10 to disconnect from contact 13 thereby opening the circuit. After this has happened, the controlled heat source is off and the temperature cannot be raised.

If the leak occurred while the fluid was in the vapor stage, the upper cutout point would still operate and no harm could occur. Then when the temperature decreased by normal operation of the controlled device the fluid would again become liquid and diaphragm 40 would distend detecting the loss of liquid and arm 10 would disconnect from contact 13 as shown in Figure 3. Thus under all conditions the switch remains operative to limit the high temperature to the desired value and opens the circuit when a leak occurs even though the loss of fluid is very slow.

It is obvious that various modifications and uses may be made without departing from the spirit of the invention, for example, instead of the illustrative switch, two separate switches or a single pole switch of usual construction might be actuated by a suitable leakage. Also it will be apparent that control means other than electric switches could be employed, and the switching action might well be that of a fluid circuit. I do not wish to be understood as limiting myself to the exact forms, constructions, arrangements and combinations of parts herein shown and described, and wish only to be limited by the following claims.

I claim:

1. A control device comprising, circuit controlling means having an operator movable successively through a first range in which the circuit is open, a second range in which the circuit is closed and a third range in which the circuit is open, an expansible chamber having a flexible wall operatively connected to said operator, a volatile thermostatic fluid filling said chamber, said operator and said flexible wall providing a bias tending to reduce the volume of said chamber, the bias being sufficient at temperatures below a predetermined value to maintain said fluid entirely in the liquid state, said fluid in liquid state normally maintaining said operator in a position within its second range of movement, and said fluid vaporizing at a temperature above the predetermined value to supply sufficient pressure to move said flexible wall against the bias provided to move said operator into its third range to open the circuit.

2. A control device comprising, circuit controlling means having an operator movable successively through a first range in which the circuit is open, a second range in which the circuit is closed and a third range in which the circuit is open, an expansible chamber having a flexible wall operatively connected to said operator, a volatile thermostatic fluid filling said chamber, said operator and said flexible wall providing a bias tending to reduce the volume of said chamber, the bias being sufficient at temperatures below a predetermined value to maintain said fluid entirely in the liquid state, said fluid in liquid state normally maintaining said operator in a position within its second range of movement, and said fluid vaporizing at a temperature above the predetermined value to supply sufficient pressure to move said flexible wall against the bias provided to move said operator into its third range to open the circuit, said operator being movable into its first range on loss of fluid from said chamber.

3. A temperature responsive device comprising, control means having an actuator movable to maintain said control means in one controlling condition through an intermediate portion of its total range of movement and in another controlling condition in positions on either side of the intermediate range, a temperature sensing element including a quantity of expansible fluid within a chamber having a resilient wall movable on volume changes to move said actuator through its total range of movement, and biasing means including said movable wall tending to reduce the volume of said chamber, said expansible fluid in its liquid state completely filling said chamber at a predetermined temperature and consequent volume thereof and position of said wall that positions said actuator at a point within its intermediate range of movement, said fluid expanding according to its vapor pressure characteristics at temperatures above said predetermined temperature and at a second predetermined higher temperature resulting in a volume and corresponding position of said wall that positions said actuator in one direction beyond the intermediate range of movement, the quantity of said fluid being such that at the lowest temperature to which it is normally subjected the volume will remain great enough to maintain said wall in positions to maintain said actuator within its intermediate range of movement.

4. A temperature responsive device comprising, control means having an actuator movable to maintain said control means in one controlling condition through an intermediate portion of its total range of movement and in another controlling condition in positions on either side of the intermediate range, a temperature sensing element including a quantity of expansible fluid within a chamber having a resilient wall movable on volume changes to move said actuator through its total range of movement, and biasing means including said movable wall tending to reduce the volume of said chamber, said expansible fluid in its liquid state completely filling said chamber at a predetermined temperature and consequent volume thereof and position of said wall that positions said actuator at a point within its intermediate range of movement, said fluid expanding according to its vapor pressure characteristics at temperatures above said predetermined temperature and at a second predetermined higher temperature resulting in a volume and corresponding position of said wall that positions said actuator in one direction beyond the intermediate range of movement, the quantity of said fluid being such that at the lowest temperature to which it is normally subjected the volume will remain great enough to maintain said wall in positions to maintain said actuator within its intermediate range of movement, said movable wall moving to a position at which said actuator is moved to a position in the other direction beyond its intermediate range of movement on loss of a quantity of fluid from said chamber.

References Cited in the file of this patent

UNITED STATES PATENTS

| | | |
|---|---|---|
| 2,552,962 | Hacker | May 15, 1951 |
| 2,620,414 | Thorsheim | Dec. 2, 1952 |
| 2,757,260 | Weber et al. | July 31, 1956 |